May 6, 1969     T. RUDAS     3,442,508
THEATRICAL STAGE SETTING FOR COMBINING MOTION
PICTURES AND LIVE ACTION
Filed Feb. 18, 1966
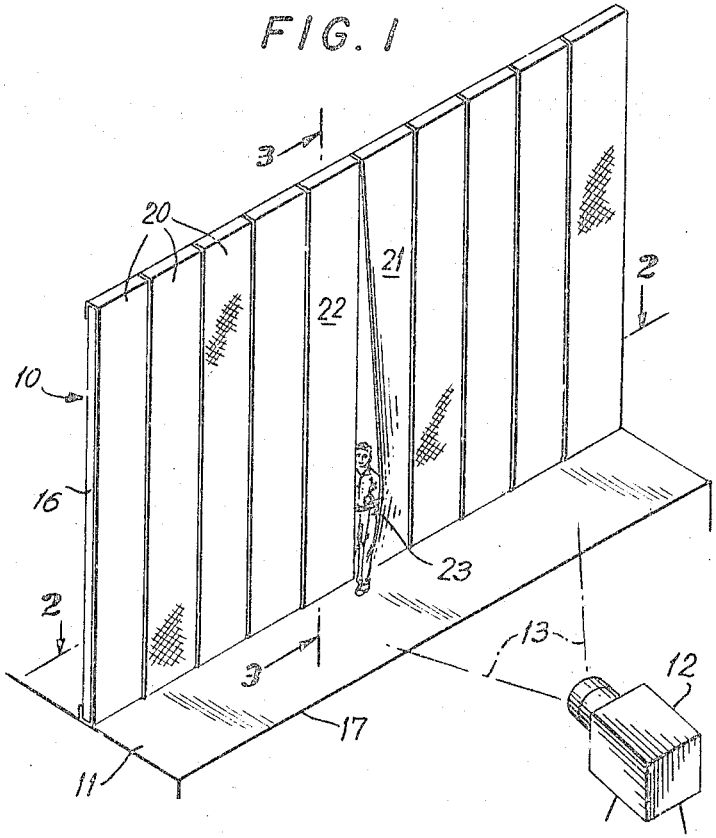
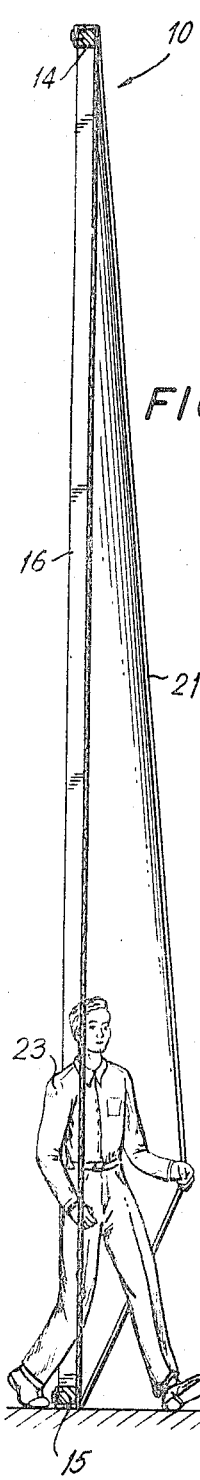
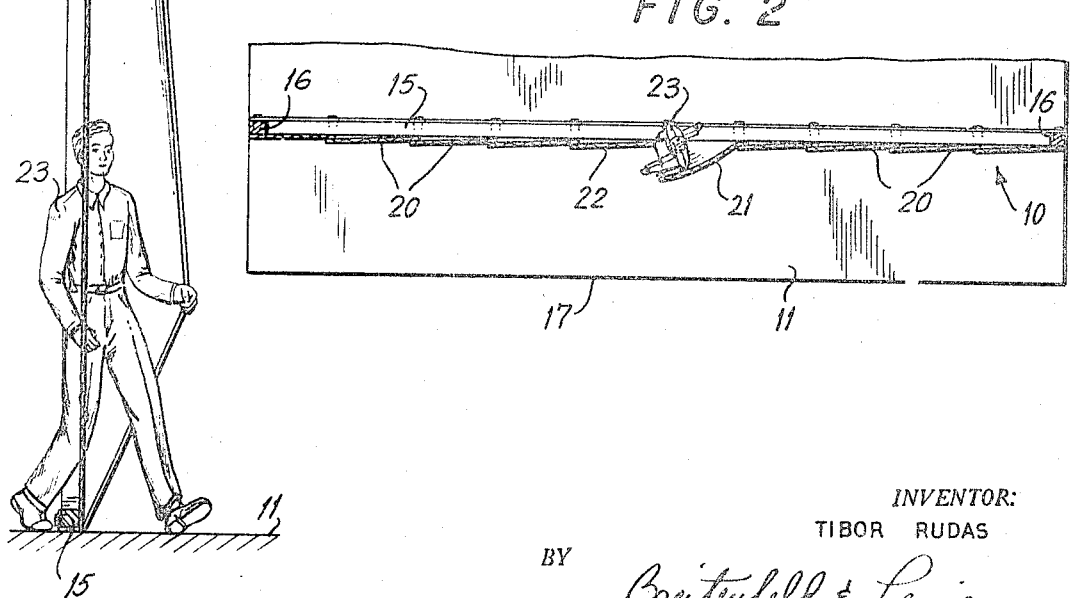
INVENTOR:
TIBOR RUDAS
BY
Breitenfeld & Levine
ATTORNEYS

United States Patent Office

3,442,508
Patented May 6, 1969

---

3,442,508
THEATRICAL STAGE SETTING FOR COMBINING MOTION PICTURES AND LIVE ACTION
Tibor Rudas, Sydney, New South Wales, Australia, assignor to Rudas Theatrical Organisation Pty. Ltd., a corporation of Australia
Filed Feb. 18, 1966, Ser. No. 528,572
Int. Cl. G03b 21/60; A63j 5/00
U.S. Cl. 272—21        3 Claims

ABSTRACT OF THE DISCLOSURE

Theatrical setting includes a stage, and a screen for receiving motion pictures from a projector. Screen is formed of flat parallel stretchable strips held in taut condition. During motion picture display, strips are expanded by pressing against them to create temporary openings in screen through which live action moves from one side of screen to the other.

---

This invention relates to a theatrical stage setting, and more particularly to a setting by means of which transformations between motion pictures and live stage action can be accomplished.

It is an object of the invention to provide an improved apparatus by means of which certain striking theatrical effects can be produced, involving interaction between screen-projected images and live actors. A more particular objective is to provide a theatrical setting by means of which these effects can be achieved with unusual smoothness and efficiency.

The invention is predicated upon the employment of a motion picture screen provided with at least one slit, the portion of the screen adjacent to at least one edge of the slit being stretchable. The stretchable portion is provided with suitable tension so that it normally remains in a flat condition substantially in the plane of the screen, and consequently the slit is not noticeable to the audience. At any desired time during the projectioin of a motion picture on the screen, an actor standing behind the screen may push against the stretchable portion, thereby enlarging the slit and providing a temporary aperture in the screen. The actor can quickly move through the aperture, and upon releasing the stretchable portion the latter will snap back to its original condition.

A special feature of the invention is the provision of a plurality of slits spaced apart along the length of the screen so that the actor moving through the screen is given the choice of a number of locations at which he may appear on the stage in front of the screen. Preferably, the plurality of slits is obtained by forming the screen of a series of parallel strips each formed of stretchable material. Advantageously, the longitudinal margin of each strip overlaps the longitudinal edge of the next adjacent strip to insure a continuity of screen surface for exhibiting the motion picture.

Additional objects and features of the invention will be apparent from the following detailed description in which reference is made to the accompanying drawings.

In the drawings:
FIG. 1 is a perspective view of a theatrical stage setting according to the present invention;
FIG. 2 is a horizontal cross-sectional view taken on line 2—2 of FIG. 1; and
FIG. 3 is a vertical cross-sectional view taken on line 3—3 of FIG. 1.

In each of the figures, it is to be understood that the proportions shown are not necessarily accurate in all respects, in order to permit clarity of illustration.

In the stage setting chosen to illustrate the present invention, a motion picture screen 10 of special character rises vertically upwardly from a stage 11, and a projector 12 is arranged to cast motion picture images onto the screen, as indicated by the rays 13.

The screen 10 includes a rectangular frame formed by upper and lower horizontal members 14 and 15, and side members 16 for supporting the upper member 14 above the lower member 15. The frame is located a sufficient distance back from the front edge 17 of the stage 11 to provide adequate room on the stage portion in front of the frame for the desired live action to take place. The frame is preferably secured to the stage or in some way made stationary with respect to the stage. However, under certain circumstances it may be desirable to make the frame movable, either to and fro, or laterally, with respect to the stage.

Arranged across the width of the frame is a series of vertical strips 20, 21, and 22 each formed of an elastic, or stretchable material. The strips are of a color and nature adapted to satisfactorily display the motion picture images cast upon them. Each elastic strip is maintained in place by securement of its ends to the upper and lower members 14 and 15, respectively, by any suitable means such as staples, nails, or hooks. The strips are all slightly tensioned to keep them in a taut, planar condition and prevent them from sagging, so that they serve, together, to provide a substantially planar surface for displaying motion pictures.

The opposed longitudinal edges of each two adjacent strips 20–22 define a slit in the screen 10.

When, during a performance, it is desired to supplement or replace the motion picture being displayed with live stage action, an actor 23 positioned behind the screen 10 can move through the screen. This is accomplished by pushing against one of the stretchable strips, say the strip 21, in order to expand that strip and temporarily enlarge the slit between the strips 21 and 22, as indicated in the drawings. The enlarged split provides an aperture in the screen large enough to permit the actor to pass through it. As soon as the actor has completed his movement through the screen, the strip 21 snaps back to its original flat condition by virtue of its inherent resilience. When the time comes for the actor 23 to leave the stage, he can move from front to back through the screen in the same way as just described.

The strips 20–22 are preferably relatively narrow with respect to their length. For example, strips having a width of between three and four feet have been used successfully. By using relatively narrow strips, a large number of slits are provided, spaced apart across the width of the screen, thus offering to the live actors many points of entry to the stage from behind the screen. Thus, an actor can select the particular location he wishes to appear at on the state upon moving through the screen, and several actors can move through the screen simultaneously, each through a different slit.

In order to insure that no gaps inadvertently appear in the screen between the strips 20–22, it is advantageous to arrange the strips so that the longitudinal margin of each overlaps the opposite longitudinal edge of the strip adjacent to it, as is shown in FIG. 2. Since the material of the strips is so thin compared to their width and the distance of the audience from the screen, the overlapped edges of the strips are not at all noticeable to the audience and do not detract in any way from the motion picture images displayed on the screen.

It will be appreciated that the present invention provides a theatrical stage setting which permits live action to move rapidly through a motion picture screen with a minimum of effort, and with only a minor degree of disturbance to the planar condition of the screen.

The invention has been shown and described in preferred form only, and by way of example, and many variations may be made in the invention which will still be comprised within its spirit. It is understood, therefore, that the invention is not limited to any specific form or embodiment except insorfar as such limitations are included in the appended claims.

What is claimed is:

1. A theatrical stage setting comprising a stage for live action, a motion picture projector, and a screen arranged to receive motion picture images cast by said projector, said screen comprisingly a plurality of parallel strips each formed of stretchable resilient material, each strip being flat and having a width greater than its thickness so that it presents a flat surface for receiving the motion picture images, all of said strips being arranged in substantially the same plane and each strip contacting the strips adjacent to it along its longitudinal edges, and means disposed along at least a portion of the periphery of said screen to which said strips are secured for maintaining said strips taut so that they normally cooperate to provide a substantially flat motion picture screen for reflecting motion picture images with a minimum of distortion, but each strip being expandable by pressing against it to thereby create a space between it and the next adjacent strip to permit live action to pass through the space from one side of the screen to the other.

2. A theatrical stage setting as defined in claim 1 wherein said strips are vertical.

3. A theatrical stage setting as defined in Claim 1 wherein the longitudinal margin of each of said strips overlaps the longitudinal edge of the next adjacent strip.

References Cited

UNITED STATES PATENTS

| | | | |
|---|---|---|---|
| 1,102,595 | 7/1914 | Knight | 272—10 |
| 1,835,642 | 12/1931 | Friedland | 350—117 |
| 2,147,648 | 2/1939 | Greathouse | 272—10 |
| 3,035,836 | 5/1962 | McCulley | 350—117 X |
| 3,072,410 | 1/1963 | Simjian | 273—105.1 X |
| 3,084,933 | 4/1963 | Alswang | 272—10 |

FOREIGN PATENTS 506,078  12/1954  Italy.

ANTON O. OECHSLE, *Primary Examiner.*

M. R. PAGE, *Assistant Examiner.*

U.S. Cl. X.R.

350—117; 352—89